(12) United States Patent
Casagrande et al.

(10) Patent No.: US 9,183,885 B2
(45) Date of Patent: *Nov. 10, 2015

(54) USER-INITIATED CONTROL OF AN AUDIO/VIDEO STREAM TO SKIP INTERSTITIAL CONTENT BETWEEN PROGRAM SEGMENTS

(71) Applicant: ECHOSTAR TECHNOLOGIES L.L.C., Englewood, CO (US)

(72) Inventors: Steven M. Casagrande, Castle Rock, CO (US); David A. Kummer, Highlands Ranch, CO (US); Charles W. Ergen, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/135,961

(22) Filed: Dec. 20, 2013

(65) Prior Publication Data

US 2014/0105567 A1   Apr. 17, 2014

Related U.S. Application Data

(63) Continuation-in-part of application No. 13/407,955, filed on Feb. 29, 2012, now Pat. No. 8,726,309, which is a continuation of application No. 12/130,792, filed on May 30, 2008, now Pat. No. 8,156,520.

(51) Int. Cl.
*H04N 21/4147* (2011.01)
*H04N 21/432* (2011.01)
(Continued)

(52) U.S. Cl.
CPC .................. *G11B 27/19* (2013.01); *H04N 5/76* (2013.01); *H04N 21/4147* (2013.01);
(Continued)

(58) Field of Classification Search
CPC .......... H04N 21/4147; H04N 21/4325; H04N 21/4332; H04N 21/44016; H04N 21/812; H04N 21/8456
See application file for complete search history.

(56) References Cited

U.S. PATENT DOCUMENTS 7,801,910 B2   9/2010   Houh et al.
8,156,520 B2   4/2012   Casagrande et al.
(Continued)

OTHER PUBLICATIONS

Kerns et al., "Skip, skip, skip to my video," Nov. 11, 2009, online blog, http:I/ytbizblog.blogspot.comI20091111 skip-skip-skip-to-my-video.html, 2 pages.*

(Continued)

*Primary Examiner* — Hai V Tran
(74) *Attorney, Agent, or Firm* — Ingrassia Fisher & Lorenz, P.C.

(57) ABSTRACT

Various embodiments are described for skipping, filtering, or replacing content from an audio/video stream using text data associated with the stream, wherein the stream has segments of a show interspersed with commercial breaks. A method for processing the stream determines that a commercial break is currently being output for presentation, and monitors for receipt of a user-initiated command to skip the commercial break. When a user-initiated skip command is received during the commercial break, the method automatically skips to a location in the stream that is at or near an end of the commercial break, and seamlessly continues presentation of the stream from that location. If a skip command is not received during output of the commercial break, then output of the current commercial break continues as usual. This methodology is repeated for all subsequent commercial breaks in the stream.

17 Claims, 9 Drawing Sheets

(51) Int. Cl.

| | |
|---|---|
| *H04N 21/433* | (2011.01) |
| *H04N 21/44* | (2011.01) |
| *H04N 21/81* | (2011.01) |
| *H04N 21/845* | (2011.01) |
| *G11B 27/19* | (2006.01) |
| *H04N 5/76* | (2006.01) |

(52) U.S. Cl.
CPC ...... *H04N 21/4325* (2013.01); *H04N 21/4331* (2013.01); *H04N 21/44016* (2013.01); *H04N 21/812* (2013.01); *H04N 21/8456* (2013.01)

(56) References Cited

U.S. PATENT DOCUMENTS

| | | | |
|---|---|---|---|
| 8,468,056 | B1* | 6/2013 | Chalawsky .................. 725/88 |
| 8,606,085 | B2 | 12/2013 | Gratton |
| 2003/0121037 | A1 | 6/2003 | Swix et al. |
| 2004/0049780 | A1 | 3/2004 | Gee |
| 2007/0098357 | A1* | 5/2007 | McEnroe et al. ............. 386/68 |
| 2007/0118873 | A1 | 5/2007 | Houh et al. |
| 2007/0300249 | A1 | 12/2007 | Smith et al. |
| 2008/0052739 | A1 | 2/2008 | Logan |
| 2008/0092168 | A1 | 4/2008 | Logan et al. |
| 2008/0196060 | A1 | 8/2008 | Varghese |
| 2008/0276266 | A1 | 11/2008 | Huchital et al. |
| 2008/0304809 | A1* | 12/2008 | Haberman .................... 386/68 |
| 2009/0006191 | A1* | 1/2009 | Arankalle et al. ............. 705/14 |
| 2009/0299843 | A1 | 12/2009 | Shkedi |
| 2010/0274628 | A1 | 10/2010 | Kunz et al. |
| 2012/0159537 | A1 | 6/2012 | Casagrande et al. |

OTHER PUBLICATIONS

Phil Farhi, "Free to choose," Jun. 15, 2009, online blog, http:I/ytbizblog.blogspot.com/2OO9/O6/free-to-choose.html, 1 page.*

Windows Media Services, 2007, published by Microsoft Corporation, 497 pages.*

USPTO, "Non-Final Office Action" mailed Jun. 4, 2014 for U.S. Appl. No. 13/294,818.

US Patent and Trademark Office, Non-Final Office Action dated Sep. 4, 2013 for U.S. Appl. No. 13/407,955.

US Patent and Trademark Office, Non-Final Office Action dated Feb. 20, 2014 for U.S. Appl. No. 12/702,750.

US Patent and Trademark Office, Notice of Allowance dated Feb. 12, 2014 for U.S. Appl. No. 13/407,955.

Canadian Intellectual Property Office, Notice of Allowance dated Dec. 23, 2013 for Canadian Patent Application No. 2,717,933.

Canadian Intellectual Property Office, Notice of Allowance dated Jan. 23, 2014 for Canadian Patent Application No. 2,665,855.

Intellectual Property Corporation of Malaysia, "Substantive Examination Adverse Report" dated May 15, 2014 for Malaysia Patent Application No. PI 2010004195.

USPTO, "Non-Final Office Action" dated Apr. 2, 2012 for U.S. Appl. No. 12/703,049.

USPTO, "Non-Final Office Action" dated Apr. 23, 2014 for U.S. Appl. No. 12/703,049.

USPTO "Non-Final Office Action" dated May 22, 2014 for U.S. Appl. No. 13/294,800.

USPTO, Office Action for U.S. Appl. No. 14/102,621 mailed Apr. 15, 2015.

European Patent Office, Communication pursuant to Article 94(3) EPC for European Patent Application No. 10 732 771.0 mailed Apr. 20, 2015.

* cited by examiner

USER-INITIATED CONTROL OF AN AUDIO/VIDEO STREAM TO SKIP INTERSTITIAL CONTENT BETWEEN PROGRAM SEGMENTS

CROSS-REFERENCE TO RELATED APPLICATIONS

This application is a continuation-in-part of U.S. patent application Ser. No. 13/407,955 (filed Feb. 29, 2012), which is a continuation of U.S. patent application Ser. No. 12/130,792 (filed May 30, 2008, and issued on Apr. 10, 2012 as U.S. Pat. No. 8,156,520).

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, (e.g., watch a television program at a different time than it was originally broadcast). However, commercials within the recording may be time sensitive, and may no longer be relevant to the user when they finally get around to watching the program. Thus, the user is essentially presented with commercials and other advertisements which are of little use to both the advertiser and the viewer.

BRIEF DESCRIPTION OF THE DRAWINGS

The same number represents the same element or same type of element in all drawings.

DETAILED DESCRIPTION

Figure 1:
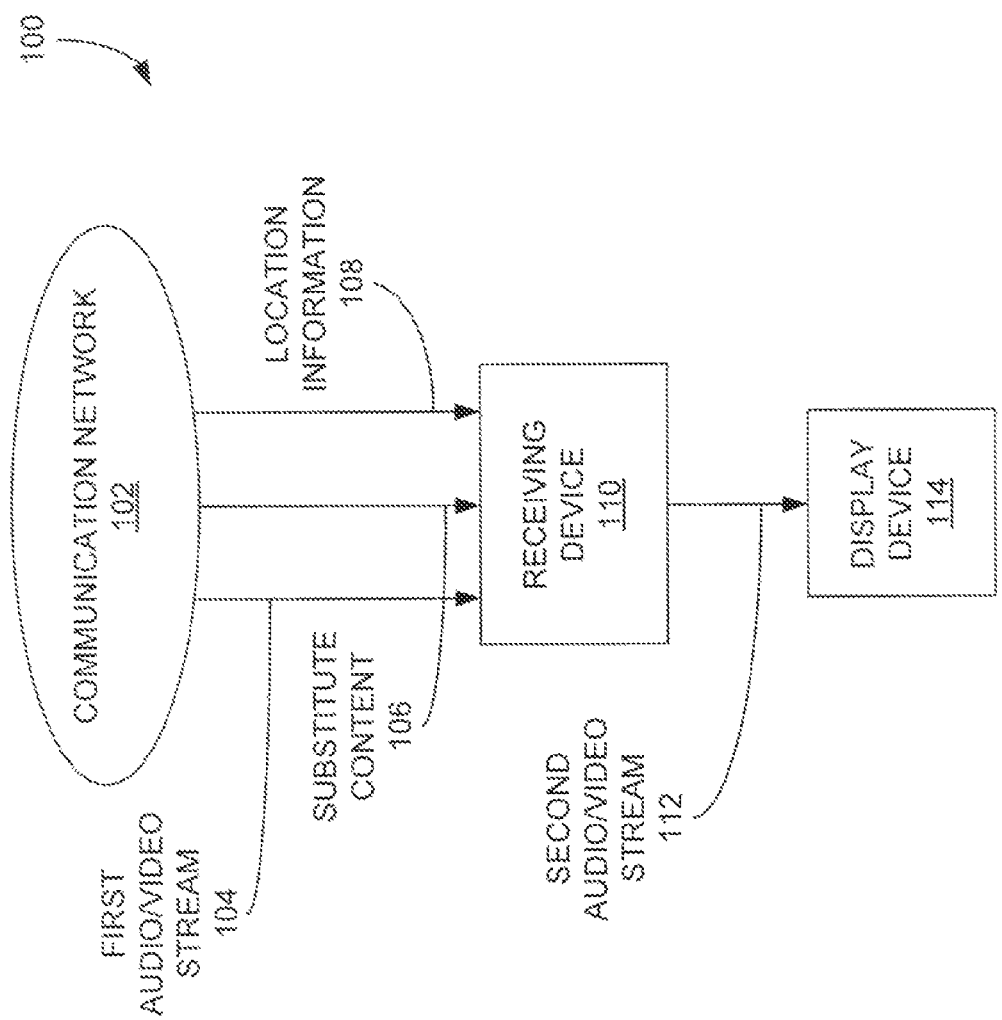
FIG. 1 illustrates an embodiment of a system for presenting content to a user.

The various embodiments described herein generally provide apparatus, systems and methods which facilitate the reception, processing, and outputting of audio/video content. More particularly, the various embodiments described herein provide for the identification of portions of an audio/video stream that are to be skipped during presentation of the audio/video stream. The various embodiments further provide for the insertion of substitute content into locations of the audio/video stream during presentation. In short, various embodiments described herein provide apparatus, systems and/or methods for replacing content in an audio/video stream based on data included in or associated with the audio/video stream.

In at least one embodiment, the audio/video stream to be received, processed, outputted and/or communicated may come in any form of an audio/video stream. Exemplary audio/video stream formats include Motion Picture Experts Group (MPEG) standards, Flash, Windows Media and the like. It is to be appreciated that the audio/video stream may be supplied by any source, such as an over-the-air broadcast, a satellite or cable television distribution system, a digital video disk (DVD) or other optical disk, the internet or other communication networks, and the like. In at least one embodiment, the audio/video data may be associated with supplemental data that includes text data, such as closed captioning data or subtitles. Particular portions of the closed captioning data may be associated with specified portions of the audio/video data.

In various embodiments described herein, the text data associated with an audio/video stream is processed to identify portions of the audio/video stream. More particularly, the text data may be processed to identify boundaries of portions of the audio/video stream. The portions of the audio/video stream between identified boundaries may then be designated for presentation to a user, or may be designated for skipping during presentation of the audio/video stream. Thus, in at least one embodiment, portions of an audio/video stream that a user desires to view may be presented to the user, and portions of the audio/video stream that a user desires not to view may be skipped during presentation of the audio/video stream. Further, substitute content may be identified for presentation in association with portions of the original audio/video stream. The substitute content may be inserted within any identified location of the audio/video stream. For example, the original commercials included in a recorded audio/video stream may be replaced with updated commercials during subsequent presentation of the recorded audio/video stream.

Generally, an audio/video stream is a contiguous block of associated audio and video data that may be transmitted to, and received by, an electronic device, such as a terrestrial ("over-the-air") television receiver, a cable television receiver, a satellite television receiver, an internet connected television or television receiver, a computer, a portable electronic device, or the like. In at least one embodiment, an audio/video stream may include a recording of a contiguous block of programming from a television channel (e.g., an episode of a television show). For example, a digital video recorder may record a single channel between 7:00 and 8:00, which may correspond with a single episode of a television program. Generally, an hour long recording includes approximately 42 minutes of video frames of the television program, and approximately 18 minutes of video frames of commercials and other content that is not part of the television program.

The television program may be comprised of multiple segments of video frames, which are interspersed with interstitials (e.g., commercials). As used herein, an interstitial is the video frames of a recording that do not belong to a selected show (e.g., commercials, promotions, alerts, and other shows). A segment of video includes contiguous video frames of the program that are between one or more interstitials.

Further, an audio/video stream may be delivered by any transmission method, such as broadcast, multicast, simulcast, closed circuit, pay-per-view, point-to-point (by "streaming," file transfer, or other means), or other methods. Additionally, the audio/video stream may be transmitted by way of any communication technology, such as by satellite, wire or optical cable, wireless, or other means. The audio/video stream may also be transferred over any type of communication network, such as the internet or other wide area network, a local area network, a private network, a mobile communication system, a terrestrial television network, a cable television network, and a satellite television network.

FIG. 1 illustrates an embodiment of a system 100 for presenting content to a user. The system of FIG. 1 is operable for replacing audio/video content within a contiguous block of audio/video data with substitute content for presentation to a user. The system 100 includes a communication network 102, a receiving device 110 and a display device 114. Each of these components is discussed in greater detail below.

The communication network 102 may be any communication network capable of transmitting an audio/video stream. Exemplary communication networks include television distribution networks (e.g., over-the-air, satellite and cable television networks), wireless communication networks, public switched telephone networks (PSTN), and local area networks (LAN) or wide area networks (WAN) providing data communication services. The communication network 102 may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 110 of FIG. 1 may be any device capable of receiving an audio/video stream from the communication network 102. For example, in the case of the communication network 102 being a cable or satellite television network, the receiving device 110 may be a set-top box configured to communicate with the communication network 102. The receiving device 110 may be a digital video recorder in some embodiments. In another example, the receiving device 110 may be computer, a personal digital assistant (PDA), or similar device configured to communicate with the internet or comparable communication network 102. While the receiving device 110 is illustrated as receiving content via the communication network 102, in other embodiments, the receiving device may receive, capture and record video streams from non-broadcast services, such as video recorders, DVD players, personal computers or the internet.

The display device 114 may be any device configured to receive an audio/video stream from the receiving device 110 and present the audio/video stream to a user. Examples of the display device 114 include a television, a video monitor, or similar device capable of presenting audio and video information to a user. The receiving device 110 may be communicatively coupled to the display device 114 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the display device 114 may be integrated within the receiving device 110. For example, each of a computer, a PDA, and a mobile communication device may serve as both the receiving device 110 and the display device 114 by providing the capability of receiving audio/video streams from the communication network 102 and presenting the received audio/video streams to a user. In another implementation, a cable-ready television may include a converter device for receiving audio/video streams from the communication network 102 and displaying the audio/video streams to a user.

In the system 100, the communication network 102 transmits each of a first audio/video stream 104, substitute content 106 and location information 108 to the receiving device 110. The first audio/video stream 104 includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations.

Also associated with the first audio/video stream 104 is supplemental data providing information relevant to the audio data and/or the video data of the first audio/video stream 104. In one implementation, the supplemental data includes text data, such as closed captioning data, available for visual presentation to a user during the presentation of the associated audio and video data of the audio/video data stream 104. In some embodiments, the text data may be embedded within the audio/video stream during transmission across the communication network 102 to the receiving device 110. In one example, the text data may conform to any text data or closed captioning standard, such as the Electronic Industries Alliance 708 (EIA-708) standard employed in ATSC transmissions or the EIA-608 standard. When the text data is available to the display device 114, the user may configure the display device 114 to present the text data to the user in conjunction with the video data.

Each of a number of portions of the text data may be associated with a corresponding portion of the audio data or video data also included in the audio/video stream 104. For example, one or more frames of the video data of the audio/video stream 104 may be specifically identified with a segment of the text data included in the first audio/video stream 104. A segment of text data (e.g., a string of bytes) may include displayable text strings as well as non-displayable data strings (e.g., codes utilized for positioning the text data). As a result, multiple temporal locations within the audio/video stream 104 may be identified by way of an associated portion of the text data. For example, a particular text string or phrase within the text data may be associated with one or more specific frames of the video data within the first audio/video stream 104 so that the text string is presented to the user simultaneously with its associated video data frames. Therefore, the particular text string or phrase may provide an indication of a location of these video frames, as well as the portion of the audio data synchronized or associated with the frames.

The communication network 102 also transmits substitute content 106 and location information 108 to the receiving device 110. The substitute content 106 and/or the location information 108 may be transmitted to the receiving device 110 together or separately. Further, the substitute content 106 and/or the location information 108 may be transmitted to the receiving device 110 together or separately from the first audio/video stream 104. Generally, the substitute content 106 is provided to replace or supplant a portion of the first audio/video stream 104. The location information 108 specifies locations within the first audio/video stream 104 that are to be skipped and/or presented during presentation of the audio/video data of the first audio/video stream 104 by the receiving device 110. For example, if the first audio/video stream 104 includes one or more segments of a television show interspersed with one or more interstitials, then the location information 108 may identify the locations of the segments, which are to be presented, and/or identify the locations of the interstitial, which are to be skipped.

The location information 108 may identify the boundaries of either the segments or the interstitials. More particularly, the location information 108 may reference the text data to identify a video location within the first audio/video stream 104. The video location may then be utilized to determine the boundaries of either the segments or the interstitials. Generally, the beginning boundary of a segment corresponds with the ending boundary of an interstitial. Similarly, the ending boundary of a segment corresponds with the beginning boundary of an interstitial. Thus, the receiving device 110 may utilize the boundaries of segments to identify the boundaries of the interstitials, and vice versa. In some embodiments, the first audio/video stream 104 may not include both segments and interstitials, but nonetheless may include portions of audio/video data that a user desires to skip during presentation of the audio/video content of the first audio/video stream 104. Thus, the location information 108 may identify which portions of the audio/video content of the first audio/video stream are to be presented and/or skipped during presentation to a user.

In at least one embodiment, the insertion location of the substitute content 106 may be designated by the location information 108. For example, the substitute content 106 may be designated to replace an interstitial of the first audio/video stream 104. However, other locations for the substitute content 106 may also be identified by either the location information 108 or by the receiving device 110. For example, the substitute content 106 may be presented before the beginning of audio/video data of the first audio/video stream 104.

The receiving device 110 is operable for processing the text data to identify the portions of the audio/video stream which are to be presented to a user. More particularly, the receiving device 110 operates to identify the segments of the audio/video stream 104 which are to be presented to a user. The receiving device 110 further identifies substitute content 106 to present in association with the identified segments of the first audio/video stream 104. The receiving device 110 outputs a second audio/video stream 112, including the segments of the first audio/video stream 104 and the substitute content 106, for presentation on the display device 114. Thus, in some embodiments, the receiving device 110 operates to filter the interstitials from the first audio/video stream 104 and replaces the interstitials with the substitute content when outputting the second audio/video stream 112.

Figure 2:
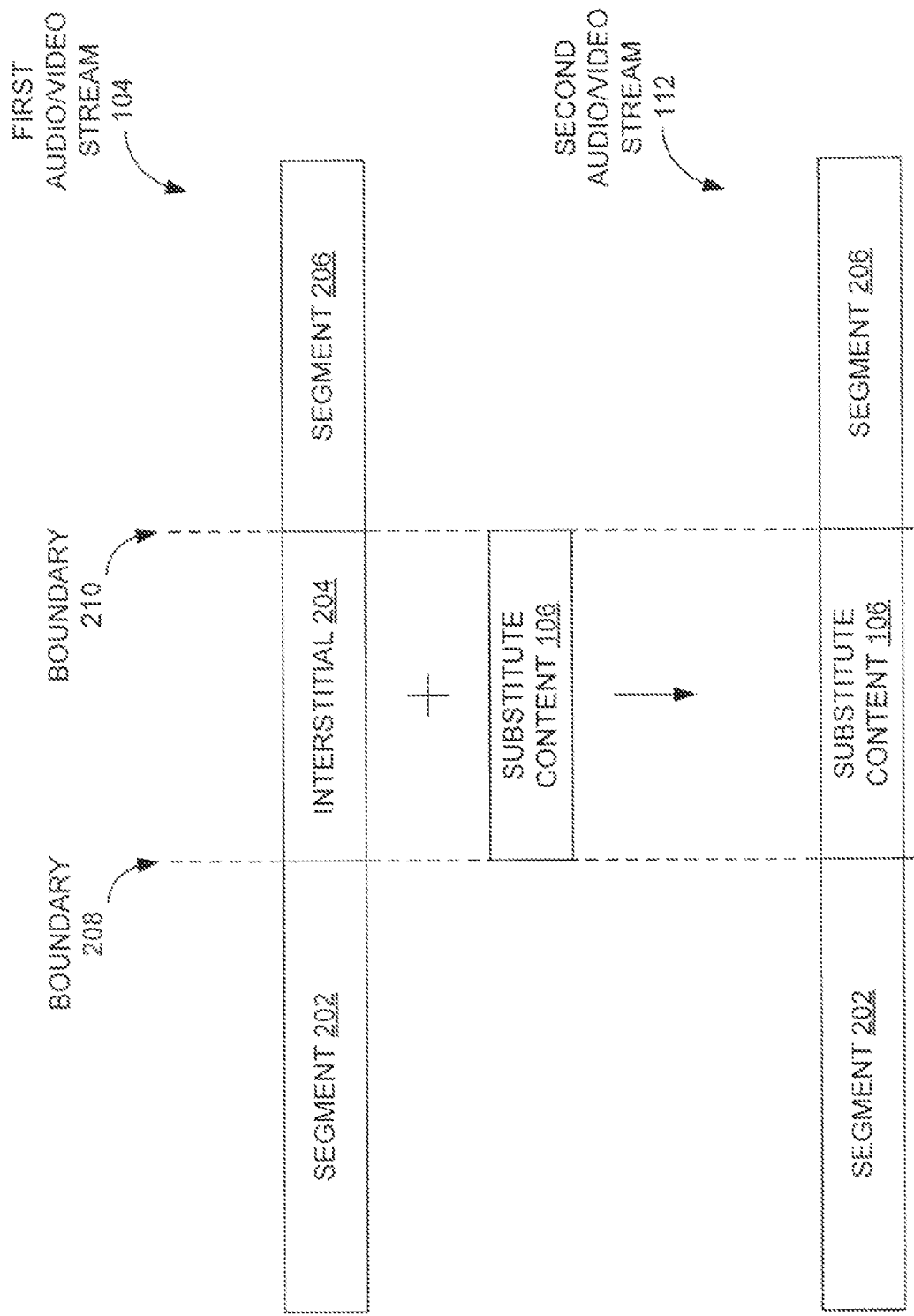
FIG. 2 illustrates an embodiment of a graphical representation of a first audio/video stream received by the receiving device, and a second audio/video stream outputted by the receiving device.

FIG. 2 illustrates an embodiment of a graphical representation of the first audio/video stream 104 received by the receiving device 110, and a second audio/video stream 112 outputted by the receiving device 110. More particularly, FIG. 2 illustrates an embodiment in which an interstitial of the first audio/video stream 104 is replaced by the substitute content 106 during presentation of the second audio/video stream 112. FIG. 2 will be discussed in reference to the system 100 of FIG. 1.

The first audio/video stream 104 includes a first audio/video segment 202 of a show, an interstitial 204 and a second audio/video segment 206 of the show. Also indicated are beginning and ending boundaries 208 and 210 of the interstitial 204, which are indicated to the receiving device 110 (see FIG. 1) by way of the location information 108. It is to be recognized that the boundaries 208 and 210 of the interstitial 204 are also boundaries of the segments 202 and 206. The supplemental data of the audio/video stream 104 is not shown in FIG. 2 to simplify the diagram.

In the specific example of FIG. 2 the boundary 208 (e.g., the ending boundary of segment 202) is the starting point at which the substitute content 106 is to replace a portion of the first audio/video stream 104. Likewise, the boundary 210 (e.g., the beginning boundary of segment 206) is the ending point at which the substitute content 106 is to replace a portion of the first audio/video stream 104. In FIG. 2, the portion of the first audio/video stream 104 to be replaced is the interstitial 204, located between the segments 202 and 206. As a result of this replacement, a second audio/video stream 112 is produced, in which the substitute content 106 is presented in place of the interstitial 204 during presentation of the second audio/video stream 112.

Figure 3:
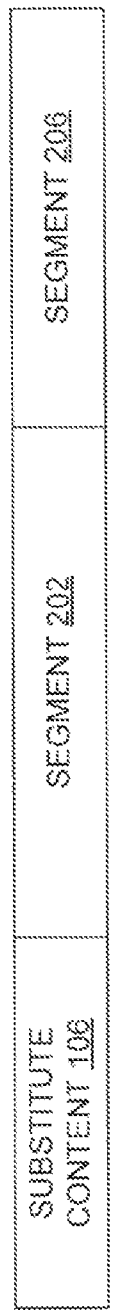
FIG. 3 illustrates an embodiment of a second audio/video stream in which the substitute content is presented before the segments of a show.

While FIG. 2 illustrates the substitute content 106 replacing the interstitial 204, it is to be appreciated that other locations of the substitute content 106 may also be utilized. FIG. 3 illustrates an embodiment of a second audio/video stream 112B in which the substitute content 106 is presented before the segments 202 and 206. Thus, the second audio/video stream 112B includes the substitute content 106 followed by the segment 202 and the segment 206. The interstitial 204 (see FIG. 2) is thus skipped during presentation of the second audio/video stream 112B.

Figure 4:
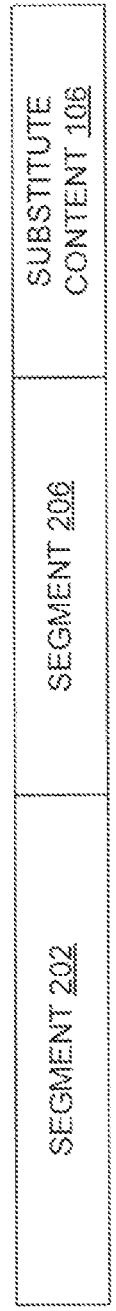
FIG. 4 illustrates an embodiment of a second audio/video stream in which the substitute content is presented after the segments of a show.

FIG. 4 illustrates an embodiment of a second audio/video stream 112C in which the substitute content 106 is presented after the segments 202 and 206. The second audio/video stream 112C includes the segment 202 followed by the segment 206 which is followed by the substitute content 106. Again, the interstitial 204 (see FIG. 2) is skipped during presentation of the second audio/video stream 112C. The substitute content 106 may be inserted at any logical location within the second audio/video stream 112B.

Returning to FIGS. 1 and 2, while the substitute content 106 is illustrated as having the same length as the interstitial 204, it is to be appreciated that the substitute content 106 may have a duration that is the same as, or different than the original content it replaces (e.g., interstitial 204). For example, the length of substitute commercials utilized during playback of the recording may be selected to maintain the original length of the recording. In another embodiment, the length of the substitute content 106 utilized may be significantly shorter or longer than the commercials or other content it replaces. For example, an interstitial may originally include four commercials totaling two minutes in length, and these four commercials may be replaced with a single commercial that is thirty seconds in length. In at least one embodiment, the receiving device 110 may restrict the user from utilizing trick mode functions (e.g., fast forwarding) in order to skip over the substitute content.

The substitute content 106 may be shown to the user to offset the costs associated with removing the original interstitials 204. Thus, by watching a substitute commercial, the user is able to avoid watching an additional 1.5 minutes of commercials that were originally in the show. In at least one embodiment, the substitute content 106 may also be selected to replace a commercial with a timelier commercial from the same advertiser. For example, a department store may have originally advertised a sale during the original broadcast of the show, but that particular sale may have since ended. Thus, the substitute content 106 may replace that particular commercial with another commercial advertising a current sale at the store.

In at least one embodiment, the substitute content may be selected based on characteristics or demographics of the user. For example, if the user is a small child, then a commercial for a toy may be selected, whereas if the viewer is an adult male, then a commercial for a sports car may be shown. In some embodiments, the characteristics utilized may be viewing characteristics of the user. Thus, the receiving device 110 may track what the user watches, and the substitute content 106 may be selected based on the collected data. For example, if the user watches many detective shows, then the substitute content may be a preview for a new detective show on Friday nights, whereas, if the user watches many reality shows, then the substitute content may be a preview for the new season of a reality show on Thursday nights.

As described above, the receiving device 110 (see FIG. 1) may identify the boundaries 208 and 210 (see FIG. 2) of the first audio/video stream 104 by processing the text data associated with the first audio/video stream 104. The boundaries 208 and 210 are identified based on the location of one or more video locations within the first audio/video stream 104. More particularly, the beginning and ending boundaries of a segment of the first audio/video stream 104 may be specified by a single video location within the segment. Thus, each segment may be identified by a unique video location within the first audio/video stream 104.

To specify a video location within the first audio/video stream 104, the location information 108 references a portion of the text data associated with the first audio/video stream 104. A video location within the first audio/video stream 104 may be identified by a substantially unique text string within the text data that may be unambiguously detected by the receiving device 110. The text data may consist of a single character, several characters, an entire word, multiple consecutive words, or the like. Thus, the receiving device 110 may review the text data to identify the location of the unique text string. Because the text string in the text data is associated with a particular location within the first audio/video stream 104, the location of the text string may be referenced to locate the video location within the first audio/video location.

In some embodiments, multiple video locations may be utilized to specify the beginning and ending boundaries of a segment. In at least one embodiment, a single video location is utilized to identify the beginning and ending boundaries of a segment. The video location may be located at any point within the segment, and offsets may be utilized to specify the beginning and ending boundaries of the segment relative to the video location. In one implementation, a human operator, of a content provider of the first audio/video stream 104, bears responsibility for selecting the text string, the video location and/or the offsets. In other examples, the text string, video location and offset selection occurs automatically under computer control, or by way of human-computer interaction. A node within the communication network 102 may then transmit the selected text string to the receiving device 110 as the location information 108, along with the forward and backward offset data.

Figure 5:
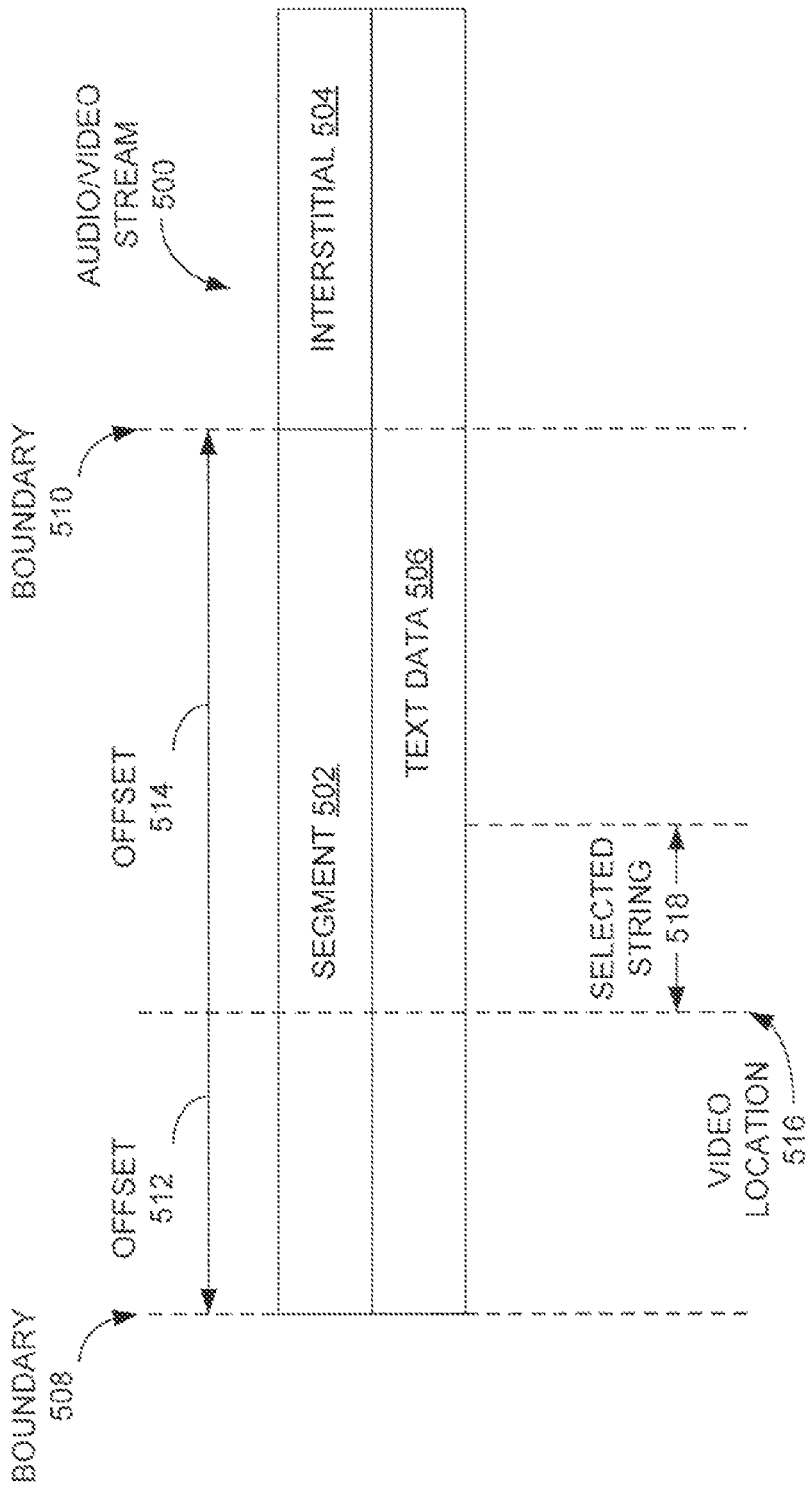
FIG. 5 illustrates an embodiment in which the boundaries of a segment of an audio/video stream are identified based on a text string included with the text data associated with the audio/video stream.

FIG. 5 illustrates an embodiment in which the boundaries of a segment of an audio/video stream 500 are identified based on a text string included with the text data associated with the audio/video stream 500. FIG. 5 will be discussed in reference to system 100 of FIG. 1. The audio/video stream 500 includes a segment 502, an interstitial 504 and text data 506. The segment 502 is defined by a boundary 508 and a boundary 510. The location information 108 received by the receiving device 110 identifies the segment 502 using a selected string 518 and offsets 512 and 514. Each of these components is discussed in greater detail below.

The receiving device 110 reviews the text data 506 to locate the selected string 518. As illustrated in FIG. 5, the selected string 518 is located at the video location 516. More particularly, in at least one embodiment, the beginning of the selected string 518 corresponds with the frame located at the video location 516. After locating the video location 516, the receiving device 110 utilizes the negative offset 512 to identify the beginning boundary 508. Likewise, the receiving device 110 utilizes the positive offset 514 to identify the ending boundaries 510. The offsets 512 and 514 are specified relative to the video location 516 to provide independence from the absolute presentation times of the video frames associated with the boundaries 508 and 510 within the audio/video stream 500. For example, two users may begin recording a particular program from two different affiliates (e.g., one channel in New York City and another channel in Atlanta). Thus, the absolute presentation time of the boundaries 508 and 510 will vary within the recordings. The technique described herein locates the same video frames associated with the boundaries 508 and 510 regardless of their absolute presentation times within a recording.

In at least one embodiment, the receiving device 110 filters the content of the audio/video stream 500 by outputting the video content of segment 502, while omitting from the presentation the interstitial 504 located outside of the boundaries 508 and 510. The receiving device 110 may additionally present the substitute content 106 adjacent to either of the boundaries 508 and 510. In some embodiments, the receiving device 110 may output the video content within the boundaries 508 and 510 and may also present video content within another set of similar boundaries 508 and 510, thus omitting presentation of the interstitial 504.

In at least one embodiment, a receiving device 110 identifies a set of boundaries 508 and 510 for a portion of the audio/video stream 500, and omits presentation of the content within the boundaries while presenting the other video content that is outside of the boundaries 508 and 510. For example, a user may watch the commercials within a football game, while skipping over the actual video content of the football game.

Depending on the resiliency and other characteristics of the text data, the node of the communication network 102 generating and transmitting the location information 108 may issue more than one instance of the location information 108 to the receiving device 110. For example, text data, such as closed captioning data, is often error-prone due to transmission errors and the like. As a result, the receiving device 110 may not be able to detect some of the text data, including the text data selected for specifying the video location 516. To address this issue, multiple unique text strings may be selected from the text data 506 of the audio/video stream 500 to indicate multiple video locations (e.g., multiple video locations 516), each having a different location in the audio/video stream 500. Each string has differing offsets relative to the associated video location that point to the same boundaries 508 and 510. The use of multiple text strings (each accompanied with its own offset(s)) may thus result in multiple sets of location information 108 transmitted over the communication network 102 to the receiving device 110, each of which is associated with the segment 502. Each set of location information 108 may be issued separately, or may be transmitted in one more other sets.

The location information 108 and the substitute content 106 may be logically associated with one another to prevent incorrect association of the location information 108 with other substitute content 106 being received at the receiving device 110. To this end, the substitute content 106 may include an identifier or other indication associating the substitute content 106 with its appropriate location information 108. Conversely, the location information 108 may include such an identifier, or both the substitute content 106 and the location information 108 may do so. Use of an identifier may be appropriate if the substitute content 106 and the location information 108 are transmitted separately, such as in separate data files. In another embodiment, the substitute content 106 and the location information 108 may be packaged within the same transmission to the receiving device 110 so that the receiving device 110 may identify the location information 108 with the substitute content 106 on that basis.

Further, both the substitute content 106 and the location information 108 may be associated with the first audio/video stream 104 to prevent any incorrect association of the data with another audio/video stream. Thus, an identifier, such as that discussed above, may be included with the first audio/video stream 104 to relate the audio/video stream 104 to its substitute content 106 and location information 108. In one particular example, the identifier may be a unique program identifier (UPID). Each show may be identified by a UPID. A recording (e.g., one file recorded by a receiving device between 7:00 and 8:00) may include multiple UPIDs. For example, if a television program doesn't start exactly at the hour, then the digital video recorder may capture a portion of a program having a different UPID. The UPID allows a digital video recorder to associate a particular show with its corresponding location information 108 and/or substitute content 106.

Use of an identifier in this context addresses situations in which the substitute content 106 and the location information 108 are transmitted after the first audio/video stream 104 has been transmitted over the communication network 102 to the receiving device 110. In another scenario, the substitute content 106 and the location information 108 may be available for transmission before the time the first audio/video stream 104 is transmitted. In this case, the communication network 102 may transmit the substitute content 106 and the location information 108 before the first audio/video stream 104.

Figure 6:
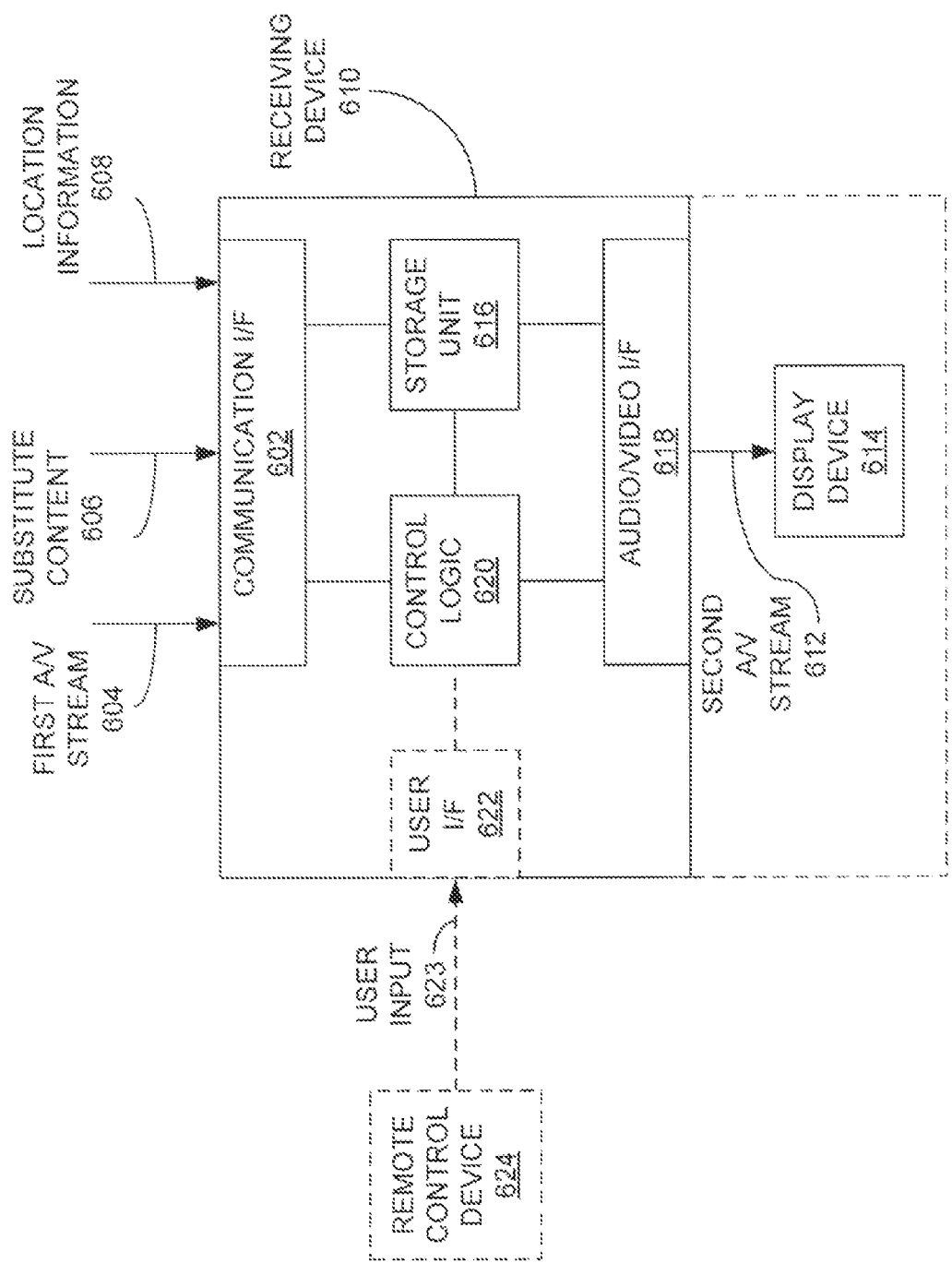
FIG. 6 illustrates an embodiment of a receiving device for presenting a recorded audio/video stream.

A more explicit view of a receiving device 610 according to one embodiment is illustrated in FIG. 6. The receiving device 610 includes a communication interface 602, a storage unit 616, an audio/video interface 618 and control logic 620. In some implementations, a user interface 622 may also be employed in the receiving device 610. Other components possibly included in the receiving device 610, such as demodulation circuitry, decoding logic, and the like, are not shown explicitly in FIG. 6 to facilitate brevity of the discussion.

The communication interface 602 may include circuitry to receive a first audio/video stream 604, substitute content 606 and location information 608. For example, if the receiving device 610 is a satellite set-top box, the communication interface 602 may be configured to receive satellite programming, such as the first audio/video stream 604, via an antenna from a satellite transponder. If, instead, the receiving device 610 is a cable set-top box, the communication interface 602 may be operable to receive cable television signals and the like over a coaxial cable. In either case, the communication interface 602 may receive the substitute content 606 and the location information 608 by employing the same technology used to receive the first audio/video stream 604. In another implementation, the communication interface 602 may receive the substitute content 606 and the location information 608 by way of another communication technology, such as the internet, a standard telephone network, or other means. Thus, the communication interface 602 may employ one or more different communication technologies, including wired and wireless communication technologies, to communicate with a communication network, such as the communication network 102 of FIG. 1.

Coupled to the communication interface 602 is a storage unit 616, which is configured to store both the first audio/video stream 604 and the substitute content 606. The storage unit 616 may include any storage component configured to store one or more such audio/video streams. Examples include, but are not limited to, a hard disk drive, an optical disk drive, and flash semiconductor memory. Further, the storage unit 616 may include either or both volatile and non-volatile memory.

Communicatively coupled with the storage unit 616 is an audio/video interface 618, which is configured to output audio/video streams from the receiving device 610 to a display device 614 for presentation to a user. The audio/video interface 618 may incorporate circuitry to output the audio/video streams in any format recognizable by the display device 614, including composite video, component video, the Digital Visual Interface (DVI), the High-Definition Multimedia Interface (HDMI), Digital Living Network Alliance (DLNA), Ethernet, Multimedia over Coax Alliance (MOCA), WiFi and IEEE 1394. Data may be compressed and/or transcoded for output to the display device 614. The audio/video interface 618 may also incorporate circuitry to support multiple types of these or other audio/video formats. In one example, the display device 614, such as a television monitor or similar display component, may be incorporated within the receiving device 610, as indicated earlier.

In communication with the communication interface 602, the storage unit 616, and the audio/video interface 618 is control logic 620 configured to control the operation of each of these three components 602, 616, 618. In one implementation, the control logic 620 includes a processor, such as a microprocessor, microcontroller, digital signal processor (DSP), or the like for execution of software configured to perform the various control functions described herein. In another embodiment, the control logic 620 may include hardware logic circuitry in lieu of, or in addition to, a processor and related software to allow the control logic 620 to control the other components of the receiving device 610.

Optionally, the control logic 620 may communicate with a user interface 622 configured to receive user input 623 directing the operation of the receiving device 610. The user input 623 may be generated by way of a remote control device 624, which may transmit the user input 623 to the user interface 622 by the use of, for example, infrared (IR) or radio frequency (RF) signals. In another embodiment, the user input 623 may be received more directly by the user interface 622 by way of a touchpad or other manual interface incorporated into the receiving device 610.

The receiving device 610, by way of the control logic 620, is configured to receive the first audio/video stream 604 by way of the communication interface 602, and store the audio/video stream 604 in the storage unit 616. The receiving device 610 is also configured to receive the substitute content 606 over the communication interface 602, possibly storing the substitute content 606 in the storage unit 616 as well. The location information 608 is also received at the communication interface 602, which may pass the location information 608 to the control logic 620 for processing. In another embodiment, the location information 608 may be stored in the storage unit 616 for subsequent retrieval and processing by the control logic 620.

At some point after the location information 608 is processed, the control logic 620 generates and transmits a second audio/video stream 612 over the audio/video interface 618 to the display device 614. In one embodiment, the control logic 620 generates and transmits the second audio/video stream 612 in response to the user input 623. For example, the user input 623 may command the receiving device 610 to output the first audio/video stream 604 to the display device 614 for presentation. In response, the control logic 620 instead generates and outputs the second audio/video stream 612. As described above in reference to FIG. 1, the second audio/video stream 612 includes portions of the audio/video data of the first audio/video stream 604, with the substitute content 606 also being presented in association with the portions of the first audio/video stream 604. In some embodiments, the substitute content 606 may replace portions of the original audio/video content of the first audio/video stream 604 at a location specified in the location information 608, as described in detail above with respect to the first audio/video stream 104 of FIG. 1. For example, the first audio/video stream 604 may include portions of a movie that are not appropriate for viewing by children. The substitute content 606 may be utilized to replace these portions of the first audio/video stream 604 with more appropriate portions of video content for output in the second audio/video stream 612. In other embodiments, the substitute content 606 may be utilized to augment portions of the first audio/video stream 604 which are presented as part of the second audio/video stream 612.

Depending on the implementation, the second audio/video stream 612 may or may not be stored as a separate data structure in the storage unit 616. In one example, the control logic 620 generates and stores the entire second audio/video stream 612 in the storage unit 616. The control logic 620 may further overwrite the first audio/Video stream 604 with the second audio/video stream 612 to save storage space within the storage unit 616. Otherwise, both the first audio/video stream 604 and the second audio/video stream 612 may reside within the storage unit 616.

In another implementation, the second audio/video stream 612 may not be stored separately within the storage unit 616. For example, the control logic 620 may instead generate the second audio/video stream 612 "on the fly" by transferring selected portions of the audio data and the video data of the first audio/video stream 604 in presentation order from the storage unit 616 to the audio/video interface 618. At the point at which the substitute content 606 indicated by the location information 608 is to be outputted, the control logic 620 may then cause the substitute content 606 to be transmitted from the storage unit 616 to the audio/video interface 618 for output to the display device 614. Once the last of the substitute content 606 has been transferred from the storage unit 616, the control logic 620 may cause remaining portions of the first audio/video stream 604 which are to be presented to a user to be outputted to the audio/video interface 618 for presentation to the display device 614.

In one implementation, a user may select by way of the user input 623 whether the first audio/video stream 604 or the second audio/video stream 612 is outputted to the display device 614 by way of the audio/video interface 618. In another embodiment, a content provider of the first audio/video stream 604 may prevent the user from maintaining such control by way of additional information delivered to the receiving device 610.

If more than one portion of substitute content 606 is available in the storage unit 616 to replace a specified portion of the audio/video of the first audio/video stream 604 or augment the first audio/video stream 604, then the user may select via the user input 623 which of the substitute content 606 are to replace the corresponding portion of the audio data of the first audio/video stream 604 upon transmission to the display device 614. Such a selection may be made in a menu system incorporated in the user interface 622 and presented to the user via the display device 614. In other embodiments, the control logic 620 may select the substitute content 606 based on various criteria, such as information specified in the location information 608, user characteristics such a demographic information or user viewing characteristics.

Figure 7:
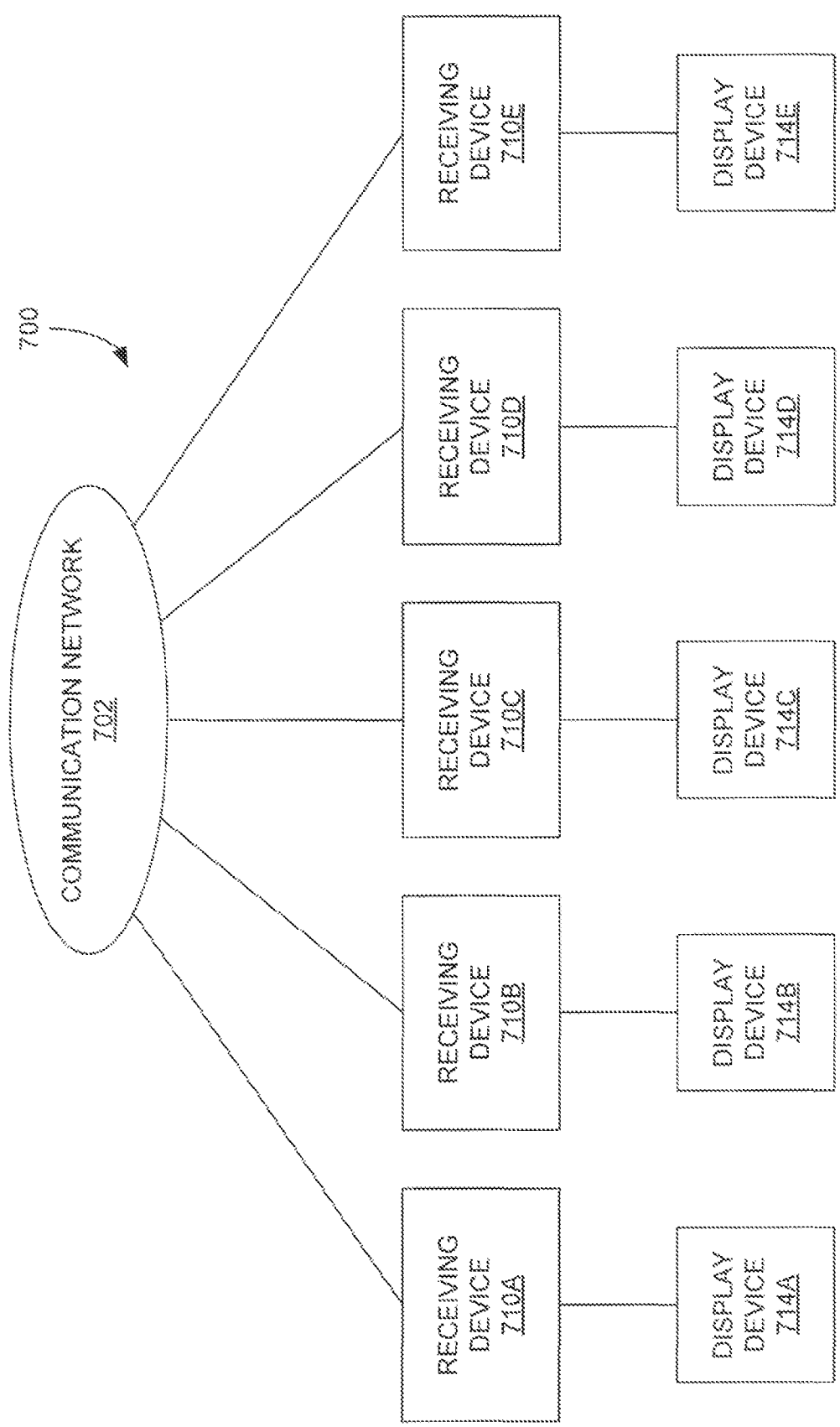
FIG. 7 illustrates an embodiment of a system in which multiple receiving devices are communicatively coupled to a communication network.

In a broadcast environment, such as that depicted in the system 700 of FIG. 7, multiple receiving devices 710A-E may be coupled to a communication network 702 to receive audio/video streams, any of which may be recorded, in whole or in part, by any of the receiving devices 710A-E. In conjunction with any number of these audio/video streams, substitute content serving to replace content in an audio/video stream or to augment content in an audio/video stream, as well as the location information for portions of the audio/video stream which are to be skipped and/or presented to a user, may be transferred to the multiple receiving devices 710A-E. In response to receiving the audio/video streams, each of the receiving devices 710A-E may record any number of the audio/video streams received. For any substitute content and associated location information that are transmitted over the communication network 702, each receiving device 710A-E may then review whether the received audio/video data segments and location information are associated with an audio/video stream currently stored in the device 710A-E. If the associated stream is not stored therein, the receiving device 710A-E may delete or ignore the related audio data segment and location information received.

In another embodiment, instead of broadcasting each possible substitute content and related location information, the transfer of an audio/video stream stored within the receiving device 710A-E to an associated display device 714A-E may cause the receiving device 710A-E to query the communication network 702 for any outstanding substitute content that apply to the stream to be presented. For example, the communication network 702 may comprise an internet connection. As a result, the broadcasting of each portion of substitute content and related location information would not be required, thus potentially reducing the amount of consumed bandwidth over the communication network 702.

Figure 8:
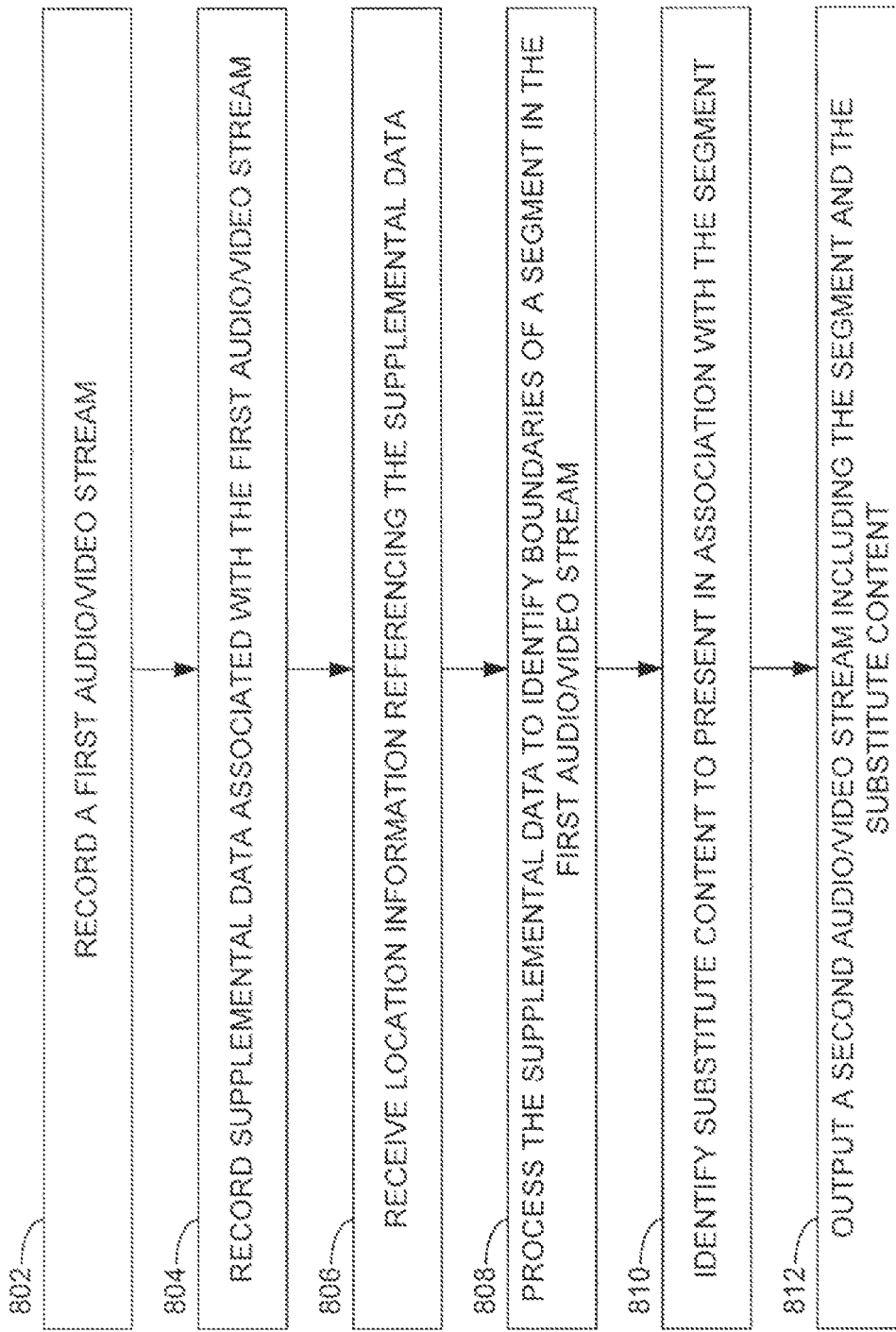
FIG. 8 illustrates an embodiment of a process for presenting a recorded audio/video stream.

FIG. 8 illustrates an embodiment of a process for presenting a recorded audio/video stream. The operation of FIG. 8 is discussed in reference to filtering a broadcast television program. However, it is to be appreciated that the operation of the process of FIG. 8 may be applied to filter other types of video stream content. The operations of the process of FIG. 8 are not all-inclusive, and may comprise other operations not illustrated for the sake of brevity.

The process includes recording a first audio/video stream including at least one segment of a show and at least one interstitial of the show (operation 802). The process further includes recording supplemental data associated with the first audio/video stream (operation 804). The supplemental data includes closed captioning data associated with the first audio/video stream. Closed captioning data is typically transmitted in two or four byte intervals associated with particular video frames. Because video frames don't always arrive in their presentation order, the closed captioning data may be sorted according to the presentation order (e.g., by a presentation time stamp) of the closed captioning data. In at least one embodiment, the sorted closed captioning data may then be stored in a data file separate from the first audio/video stream.

The process further includes receiving location information associated with the first audio/video stream (operation

806). The location information references the closed captioning data to identify a video location within the first audio/video stream. The location information may be utilized to filter portions of an audio/video stream, and may be further utilized to insert substitute content to locations within the audio/video stream. Operations 802 and 806 may be performed in parallel, sequentially or in either order. For example, the location information may be received prior to recording the audio/video stream, subsequently to recording the audio/video stream, or at the same time as the audio/video stream. In at least one embodiment, the location information is received separately from the first audio/video stream.

As described above, closed captioning data may be sorted into a presentation order and stored in a separate data file. In at least one embodiment, the sorting process is performed responsive to receiving the location information in step 806. Thus, a digital video recorder may not perform the sorting process on the closed captioning data unless the location information used to filter the audio/video stream is available for processing. In other embodiments, the closed captioning data may be sorted and stored before the location information arrives at the digital video recorder. For example, the sorting process may be performed in real-time during recording.

The process further includes processing the closed captioning data to identify boundaries of a segment of the first audio/video stream based on the video location (operation 808). More particularly, a text string included within the closed captioning data may be utilized to identify a specific location within the audio/video stream (e.g., a video location). The text string may be a printable portion of the text data or may comprise formatting or display options, such as text placement information, text coloring information and the like. The audio/video contained within the boundaries may then either be designated for presentation or may be skipped when the digital video recorder outputs portions of the first audio/video stream to a display device. It is to be appreciated that operation 808 may identify either the boundaries of the segments of the interstitials or the segments of the show to filter the interstitials (or other portions of the first audio/video stream) from the audio/video stream.

Operation 808 may be performed to identify and skip portions of an audio/video stream for a variety of reasons. For example, a user may desire to skip commercials, portions of a television program or other content which is of no interest to the user, or portions of the audio/video stream which are offensive or should otherwise not be shown to certain users. The video location identified by a text string may be located within a portion of the audio/video stream that is designated for presentation (e.g., part of a television program), or may be within a portion of the audio/video stream that is designated for skipping (e.g., in a portion of the program that a user does not desire to view).

The process further includes identifying substitute content to present during presentation of the audio/video stream in association with the segments of the show (operation 810). The process further includes outputting a second audio/video stream for presentation on a presentation device (operation 812). The second audio/video stream includes at least one segment of the show and the substitute content. Thus, a user does not see the original interstitials of the show, but rather, may see the original segments of the show interspersed with substitute content. The substitute content may be presented during playback in any logical location of the audio/video stream.

For example, the substitute content may include a lead-in ad presented before the first segment of the show. In at least one embodiment, the segments of the show may then be presented back-to-back with no additional substitute content or interstitials presented there between. Thus, for the option of automatically filtering interstitials from within the show, the user may be presented with one or more lead-in ads, which may be specifically targeted to the user. This is advantageous to a user, because they receive automatic filtering of interstitials within the show. Likewise, advertisers and/or broadcasters benefit, because this ensures that a user will see at least some form of advertisement during playback of the recording. Otherwise, a viewer could manually fast forward through all advertising, and the broadcaster and/or advertiser lose all benefit to the advertising slots within the program.

In some embodiments, the substitute content is presented at the original interstitial locations within the first audio/video stream. For example, a digital video recorder may present video frames between beginning and ending boundaries of a segment of the show. The substitute content may then be presented after a video frame of the segment that is associated with the ending boundary. In at least one embodiment, only some of the original interstitials are replaced with substitute content. Thus, other interstitials may be filtered from the original recording during playback, or even presented to the user during playback.

Thus, through the process illustrated in FIG. 8, broadcasters, advertisers and content providers (e.g., satellite television providers and cable providers) may offer various combinations of advertisement viewing during playback of recorded content. Advertisers can offer timelier and more relevant advertising to users that the users are more likely to view. Additionally, broadcasters and service providers may offer services which allow users to skip over some commercials within a recording, as long as the users are willing to watch some replacement commercials as well. This offers a compromise between the interests of broadcasters to reap the economic benefits of their television programs, while allowing users the advantages offered by time shifting devices.

Under another scenario, some programs may contain content that some users deem offensive or objectionable. To render the program palatable to a wider range of viewers, the content provider may make alternative content segments of the program available to viewers. A user who has recorded the program may then select a milder form of the audio/video content portion for viewing.

In each of these examples, the replacement audio/video content may be made available to the receiving device after the audio/video stream has been recorded at the device, thus providing a significant level of flexibility as to when the replacement audio data is provided.

User Controlled Skipping Function

The techniques and methodologies described above can be utilized in any compatible video delivery system to enhance the user's viewing experience. In certain embodiments, all of the interstitial content (e.g., the commercial breaks) in a video program event is automatically skipped with little to no user involvement. In such embodiments, the user can enjoy the program content with little to no interruptions. In other situations, however, it may be desirable to allow the user to have more control over the skipping of commercial content. In this regard, the following description relates to a methodology that gives the user the opportunity to skip or view each commercial break within the audio/video stream. Thus, rather than simply skipping through each and every commercial break in a seamless and automatic manner, the system continues with the presentation of the audio/video stream (regardless of whether an interstitial segment is currently being presented) until it receives a user-initiated request or command to advance through the interstitial segment. In other words, the user must perform some action before a commercial break is skipped. This scheme gives the user an opportunity to continue watching a commercial break if so desired.

As mentioned above with reference to FIG. 2, an audio/video stream may include multiple segments of a show (i.e., a program event), which are interspersed with interstitials. This description assumes that a program event may include a plurality of interstitials (also referred to herein as commercial breaks) located between two segments of program content. The following examples assume that the boundaries of each segment of the show (and/or the boundaries of each interstitial) can be determined using the techniques described above or any suitable methodology that can determine or detect the transitions between interstitials and segments of the show.

Each interstitial may contain one or more pieces of audio/video content, such as commercials, advertisements, previews, notices, messages, or the like. In practice, each interstitial typically contains a plurality of consecutive commercials. Thus, skipping through an interstitial segment may result in the skipping of one or more different commercials. In an alternative approach, each commercial may be considered to be a distinct piece of interstitial content, such that the user is given the ability to skip each individual commercial rather than the entire remaining portion of a commercial break.

Figure 9:
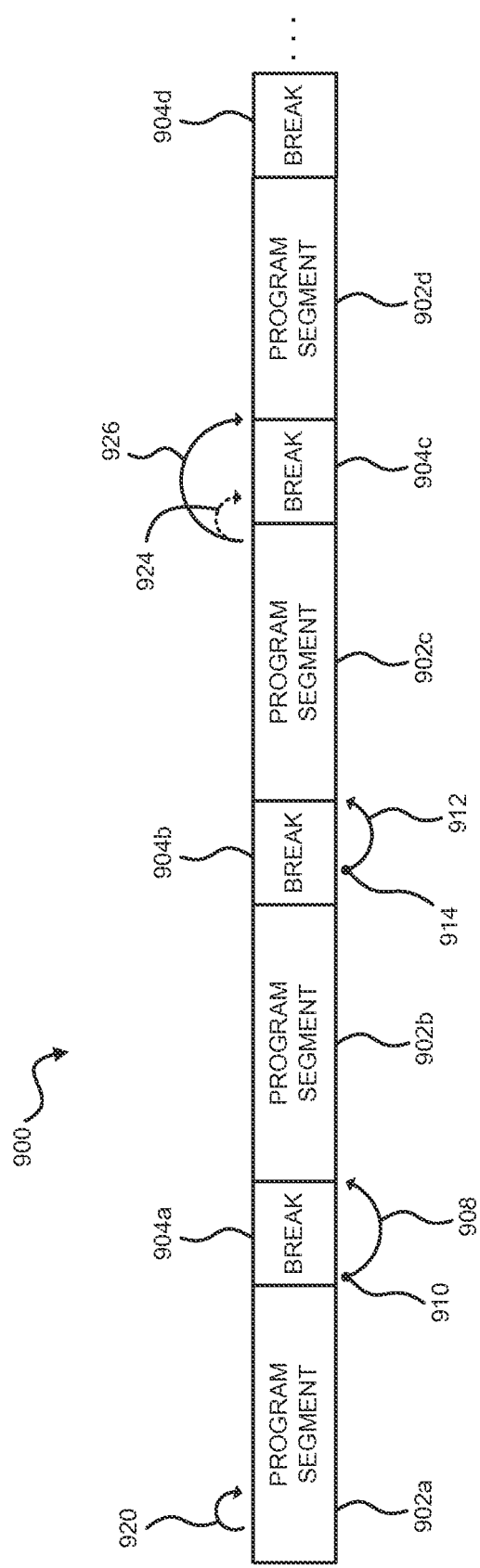
FIG. 9 is a diagram of an audio/video stream that contains segments of a show with intervening commercial breaks.

FIG. 9 is a diagram of an audio/video stream 900 that contains multiple segments 902 of a show with intervening interstitials 904 (commercial breaks). The interstitials 904 are interspersed with the segments 902 such that the totality of the program content is divided by the interstitials 904. Although FIG. 9 shows four segments 902 and four interstitials 904, the audio/video stream 900 may include any number of segments and any number of interstitials. The audio/video stream 900 may be a recorded stream that is stored locally for presentation at any desired time, or it may represent an on-demand stream that is delivered to the local receiving device at the request of the user.

The arrows in FIG. 9 represent different possible scenarios where the viewer has commanded the video receiving device (e.g., a set top box) to skip or advance through certain portions of the audio/video stream 900. Although not always required, the following description assumes that the user can control the skipping operation by activating or otherwise manipulating a user interface element of a remote control device that controls the operation of the video receiving device that is outputting the audio/video stream 900. For example, the remote control device may be provided with a devoted "Skip Ahead" button, or it may be configured such that a predetermined sequence or pattern of button presses results in the generation and transmission of a user-initiated command that in turn causes the receiving device to perform a content skipping operation.

In the absence of any trick play or skipping operations, the audio/video stream 900 would be presented in the illustrated order: (1) a first program segment 902a in its entirety; (2) a first interstitial 904a in its entirety; (3) a second program segment 902b in its entirety; (4) a second interstitial 904b in its entirety; (5) a third program segment 902c in its entirety; (6) a third interstitial 904c in its entirety; (7) a fourth program segment 902d in its entirety; (8) a fourth interstitial 904d in its entirety; and so on. In accordance with the exemplary skipping methodology presented here, the user can instruct the receiving device to skip any or all of the interstitials 904 by issuing a corresponding command or instruction for each interstitial to be skipped. Accordingly, the receiving device will output and present each interstitial 904 (following a program segment 902) until it obtains a user-initiated command to skip an interstitial 904. In the absence of such user-initiated commands, the interstitials 904 of the audio/video stream 900 will be output for presentation as usual.

FIG. 9 depicts a scenario where the user desires to skip the first interstitial 904a shortly after the transition from the first program segment 902a. The arrow 908 schematically represents how the output and presentation of the audio/video stream 900 responds to a user-initiated skip command that is received at a time corresponding to the tail 910 of the arrow 908. Notably, the skip command is issued and processed at a time during the presentation of the first interstitial 904a. Accordingly, a brief portion of the first interstitial 904a may be viewed by the user before she decides to initiate the skip command. Similarly, the arrow 912 represents how the output and presentation of the audio/video stream 900 responds to a user-initiated skip command that is received at a time corresponding to the tail 914 of the arrow 912. The arrow 912 indicates that the user initiates the skip command during the presentation of the second interstitial 904b, and after about one-third of the second interstitial 904b has already been played. These two examples demonstrate that the user-initiated skip command can be issued at any time during the presentation of an interstitial. Regardless of when the skip command is received and processed, however, the current interstitial is automatically skipped and the audio/video stream 900 continues at a point that is at or near the end of the current interstitial. Ideally, the remaining duration of the current interstitial is skipped so that playback begins at the beginning of the next program segment 902 that immediately follows the current interstitial.

For this example, no user-initiated skip command is received for the fourth interstitial 904d. Consequently, the fourth interstitial 904d continues immediately after the fourth program segment 902d, and the fourth interstitial 904d is presented in its entirety as usual. In this way, the video receiving device presents all portions of the audio/video stream 900 (segments of the show and commercial breaks) by default, and only skips the commercial breaks when commanded to do so by the user. Moreover, a user-initiated skip command must be received and processed by the video receiving device for each interstitial to be skipped. In other words, the user must perform some type of action if she desires to skip any individual commercial break.

In certain embodiments, the user-initiated skip command is associated with user activation of a designated user interface element of a remote control device, e.g., a Skip Ahead button. The Skip Ahead button may be a devoted button that is only effective to skip through commercial breaks, or it may be a "shared" button that also functions to skip through program segments if so desired. For example, the Skip Ahead button may be activated during the presentation of a program segment to cause the audio/video stream to skip forward by a specified amount of time (such as 10 seconds, 30 seconds, or the like), or to cause the audio/video stream to skip to a location that is at or near the end of the current program segment.

The following description assumes that a shared Skip Ahead button is utilized to: (1) skip forward by a predefined time period (e.g., 30 seconds) when a program segment is currently being presented; and (2) skip to a point at or near the end of a commercial break that is currently being presented. Thus, if an interstitial is currently being presented, then the functionality of the Skip Ahead button will be as described above. If, however, a program segment is currently being presented, then the functionality of the Skip Ahead button will change.

Referring again to FIG. 9, the arrow 920 schematically represents a skip-ahead operation that is associated with user activation of the Skip Ahead button. Here, the Skip Ahead button is activated during presentation of the first program segment 902a. In response to this activation of the Skip Ahead button, presentation of the audio/video stream 900 skips ahead by 30 seconds and continues at that point. Thus, the video receiving device will respond to activation of the Skip Ahead button in this manner as long as 30 seconds or more remain in the current program segment. If less than 30 seconds remain in the current program segment, then activation of the Skip Ahead button may cause the video receiving device to advance to a location that is at or near the end of the current program segment, or to a location that is at or near the end of the next interstitial. The dashed arrow 924 represents a 30-second skip that would result in the presentation of the third interstitial 904c. In this situation, it may be desirable to instead skip the entirety of the third interstitial 904c, as depicted by the arrow 926. This behavior assumes that the user is not interested in viewing the next commercial break.

Figure 10:
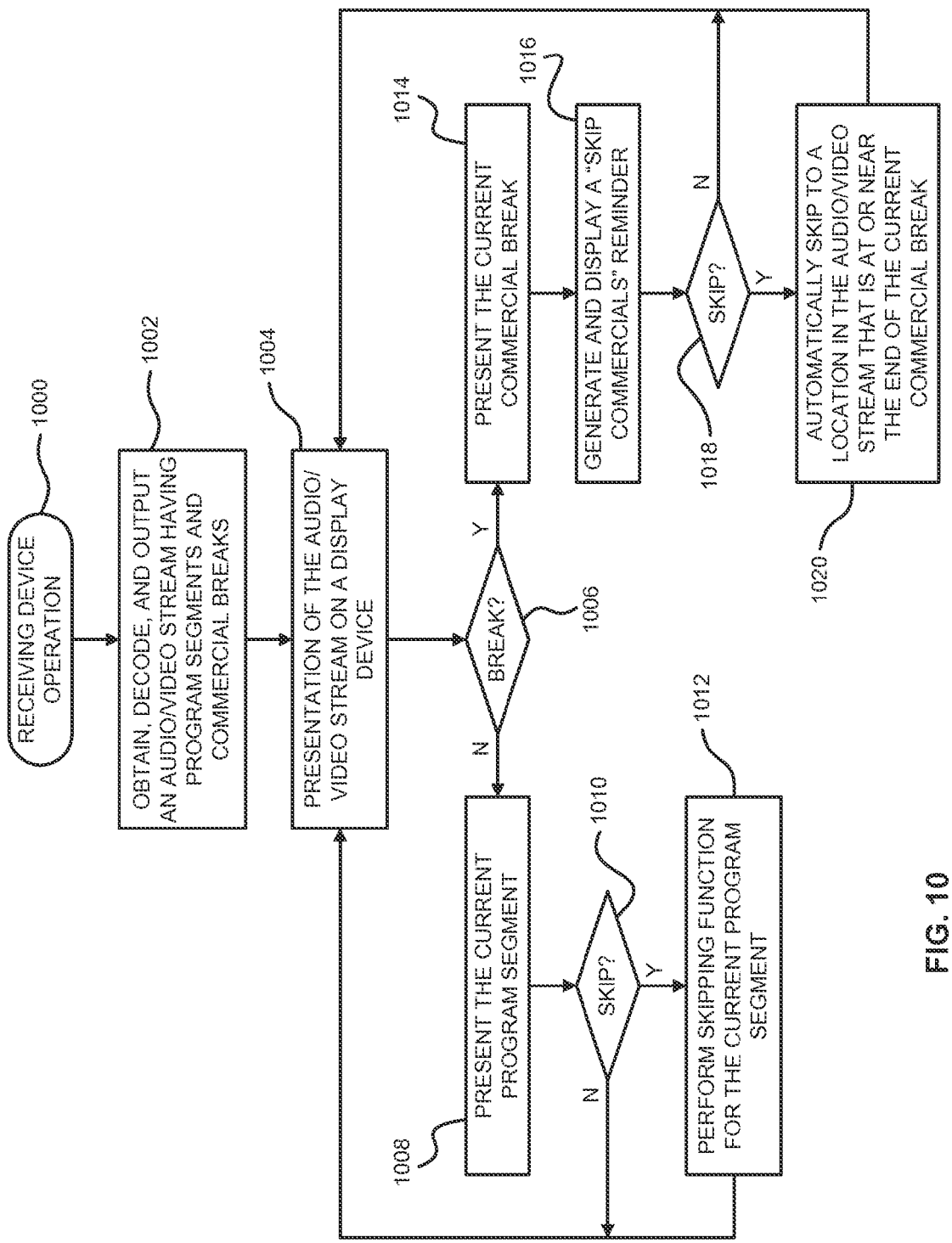
FIG. 10 is a flow chart that illustrates an exemplary embodiment of a method for operating a video receiving device.

Although not always required, the content skipping techniques described here can be employed in a video services delivery system having a video receiving device such as a set top box. Moreover, the content skipping techniques described here are suitable for use in connection with the processing and presentation of recorded audio/video streams. Recorded audio/video content may be decoded and presented to a user of a video receiving device, as is well understood. In this regard, FIG. 10 is a flow chart that illustrates an exemplary embodiment of a process 1000 for operating a video receiving device. The various tasks performed in connection with the process 1000 may be performed by software, hardware, firmware, or any combination thereof. It should be appreciated that the process 1000 may include any number of additional or alternative tasks, the tasks shown in FIG. 10 need not be performed in the illustrated order, and that the process 1000 may be incorporated into a more comprehensive procedure or process having additional functionality not described in detail herein. Moreover, one or more of the tasks shown in FIG. 10 could be omitted from an embodiment of the process 1000 as long as the intended overall functionality remains intact.

The process 1000 may begin by obtaining, decoding, and outputting an audio/video stream having program segments and intervening interstitial segments, e.g., commercial breaks (task 1002). The decoding and outputting is performed in a manner that is intended for presentation on a corresponding display or presentation device. The process 1000 continues by presenting the audio/video stream on a presentation device, a display device, or the like (task 1004). It should be appreciated that presentation of the audio/video stream at task 1004 need not correspond to the beginning of the first program segment. For example, presentation of the audio/video stream may resume at a previously saved location, which may correspond to a program segment or an interstitial segment.

During presentation of the audio/video stream, the process 1000 monitors for receipt of a user-initiated command to skip a current interstitial. Accordingly, the process 1000 may determine whether an interstitial (commercial break) is currently being presented (query task 1006). Task 1006 may leverage the techniques and technologies described in more detail above, wherein the various boundaries of the program segments and/or the interstitial segments can be determined using, for example, text data. If a program segment is currently being presented (the "No" branch of query task 1006), then the process 1000 continues by presenting the current program segment (task 1008). If a Skip Ahead command is received during presentation of the current program segment (the "Yes" branch of query task 1010), then the process 1000 performs an appropriate skipping function for the current program segment (task 1012). For example, task 1012 may cause the current program segment to skip ahead by a predetermined amount of time, such as 30 seconds. As another example, task 1012 may cause the video receiving device to skip to a video location that is at or near the end of the current program segment. As yet another example, if the Skip Ahead operation would skip into a commercial break, then task 1012 may cause the video receiving device to skip to a location at or near the end of that commercial break. In the absence of a Skip Ahead instruction (the "No" branch of query task 1010), the process 1000 simply continues with the presentation of the audio/video stream as usual. In this regard, the "No" branch of query task 1010 may lead back to task 1004 as shown in FIG. 10.

If the process 1000 determines that an interstitial of the audio/video stream is currently being output for presentation (the "Yes" branch of query task 1006), then the process 1000 presents the current interstitial segment (task 1014) while giving the user an opportunity to initiate a Skip Ahead operation to skip the current interstitial. Although not required, the illustrated embodiment of the process 1000 generates and displays a suitably formatted "skip commercials" reminder during the presentation of the current interstitial (task 1016). The displayed reminder may be a simple icon, an active GUI element, a text based notification, a popup message, an indicator light, or the like. In certain embodiments, the reminder is realized as a "fast forward" or "skip track" icon combined with a recognizable icon or graphic that indicates to the user that the current interstitial can be skipped if so desired. The reminder could be generated and displayed for only a limited amount of time (such as a few seconds) at or near the beginning of each interstitial segment, or it could be generated and persistently displayed throughout the entire duration of each interstitial segment. Thus, concurrent display of the reminder with the current interstitial can remind the user about the Skip Ahead feature without obscuring or otherwise interfering with the presentation of the interstitial itself As mentioned previously, reminders need not be displayed, and the reminder feature could be user configurable (e.g., active or inactive, display duration, type of reminder, formatting of the reminder, etc.).

During the presentation of the current interstitial, the process 1000 monitors for receipt of a user-initiated Skip Ahead command, which is effective to skip to the end of the current interstitial (query task 1018). If a Skip Ahead command is received (the "Yes" branch of query task 1018), then the process 1000 automatically skips to a location in the audio/video stream that is at or near the end of the current interstitial (task 1020). As mentioned above, a user-initiated Skip Ahead command may be associated with user activation of a designated user interface element of a remote control device, e.g., manipulation of a special button or a sequence of buttons. In certain implementations, task 1020 skips the entirety of the current commercial break. In other implementations, task 1020 skips to a location in the audio/video stream such that an ending portion of the current commercial break is still presented. After skipping ahead, the process 1000 seamlessly continues with the presentation of the audio/video stream, beginning at the new location. In this regard, task 1020 leads back to task 1004 in FIG. 10.

If a Skip Ahead command is not received (the "No" branch of query task 1018), then the process 1000 simply continues with the presentation of the audio/video stream as usual. Accordingly, the "No" branch of query task 1018 leads back to task 1004 such that presentation of the audio/video stream continues as described above. Notably, the interstitial skipping tasks of the process 1000 are repeated during the audio/video stream for each interstitial. In practice, therefore, the user must issue a command, instruction, or request before any given interstitial is skipped. For this particular example, the user is required to press the Skip Ahead button on the remote control device each time an interstitial is to be skipped.

Although specific embodiments were described herein, the scope of the invention is not limited to those specific embodiments. The scope of the invention is defined by the following claims and any equivalents therein.

What is claimed is:

1. A method for processing a recorded audio/video stream having multiple segments of a show interspersed with interstitials, the method comprising:
    recording, with a video receiving device, an audio/video stream;
    recording, with the video receiving device, closed captioning data associated with video frames of the recorded audio/video stream;
    receiving, at the video receiving device, autonomous location information that includes text strings;
    reviewing, with the video receiving device, the closed captioning data to locate the text strings included in the autonomous location information, wherein the text strings located correspond to video frames of the recorded audio/video stream that identify boundaries between the multiple segments of the show and the interstitials;
    identifying the boundaries in the recorded audio/video stream, based on the reviewing; outputting the recorded audio/video stream for presentation on a display device; during presentation of each of the interstitials:
    monitoring for receipt of a user-initiated command to skip a current one of the interstitials;
    when a user-initiated command to skip the current one of the interstitials is received, automatically skipping the current one of the interstitials and, thereafter, continuing presentation of the recorded audio/video stream, wherein the automatically skipping uses the identified boundaries in the recorded audio/video stream; and
    when a user-initiated command to skip the current one of the interstitials is not received, continuing presentation of the current one of the interstitials.

2. The method of claim 1, further comprising:
    displaying a reminder during presentation of each of the interstitials, the reminder indicating to the user that the current one of the interstitials can be skipped.

3. The method of claim 2, wherein the reminder is displayed for only a limited amount of time at or near a beginning of each of the interstitials.

4. The method of claim 2, wherein the reminder is persistently displayed throughout each of the interstitials.

5. The method of claim 1, wherein:
    a received user-initiated command is associated with user activation of a designated user interface element of a remote control device that controls operation of the video receiving device.

6. The method of claim 1, wherein:
    each of the interstitials contains a plurality of commercials.

7. A receiving device comprising:
    a communication interface that receives an audio/video stream including multiple segments of a show interspersed with interstitials, and that receives autonomous location information that includes text strings;
    a storage unit that stores the received audio/video stream as a recorded audio/video stream, and that records closed captioning data associated with video frames of the recorded audio/video stream;
    an audio/video interface that outputs the recorded audio/video stream for presentation on a display device; and
    control logic that:
        reviews the closed captioning data to locate the text strings included in the autonomous location information, wherein the text strings located correspond to video frames of the recorded audio/video stream that identify boundaries between the multiple segments of the show and the interstitials;
        identifies the boundaries in the recorded audio/video stream, based on the reviewing;
        monitors, during presentation of each of the interstitials, for receipt of a user-initiated command to skip a current one of the interstitials;
        automatically skips the current one of the interstitials when a user-initiated command to skip the current one of the interstitials is received, and continues with presentation of a next one of the multiple segments of the show, wherein the automatically skipping uses the identified boundaries in the recorded audio/video stream; and
        continues with presentation of the current one of the interstitials when a user-initiated command to skip the current one of the interstitials is not received.

8. The receiving device of claim 7, wherein the control logic and the audio/video interface cooperate to display a reminder during presentation of each of the interstitials, the reminder indicating that the current one of the interstitials can be skipped.

9. The receiving device of claim 8, wherein the reminder is displayed for only a limited amount of time at or near a beginning of each of the interstitials.

10. The receiving device of claim 8, wherein the reminder is persistently displayed throughout each of the interstitials.

11. The receiving device of claim 7, wherein:
    a received user-initiated command is associated with user activation of a designated user interface element of a remote control device that controls operation of the receiving device.

12. A method for processing an audio/video stream comprising multiple segments of a show interspersed with commercial breaks, the method comprising:
    (a) recording, with a video receiving device, the audio/video stream;
    (b) recording, with the video receiving device, closed captioning data associated with video frames of the recorded audio/video stream;
    (c) receiving, at the video receiving device, autonomous location information that includes text strings;
    (d) reviewing, with the video receiving device, the closed captioning data to locate the text strings included in the autonomous location information, wherein the text strings located correspond to video frames of the recorded audio/video stream that identify boundaries between the multiple segments of the show and the commercial breaks;
    (e) identifying the boundaries in the recorded audio/video stream, based on the reviewing;
    (f) determining that a current commercial break of the audio/video stream is currently being output for presentation on a presentation device;
    (g) monitoring, during output of the current commercial break, for receipt of a user-initiated command to skip the current commercial break;

(h) when a user-initiated command to skip the current commercial break is received during output of the current commercial break, automatically skipping to a location in the audio/video stream that is at or near an end of the current commercial break, and seamlessly continuing presentation of the audio/video stream from the location, wherein the automatically skipping uses the identified boundaries in the recorded audio/video stream;

(i) when a user-initiated command to skip the current commercial break is not received during output of the current commercial break, continuing presentation of the current commercial break; and (j) repeating (f), (g), (h), and (i) for all subsequent commercial breaks in the audio/video stream.

13. The method of claim 12, further comprising:
displaying a reminder in response to the determining, the reminder indicating that the current commercial break can be skipped.

14. The method of claim 13, wherein the user-initiated command is generated in response to user interaction with the reminder.

15. The method of claim 13, wherein the reminder is displayed for only a limited amount of time at or near a beginning of the current commercial break.

16. The method of claim 13, wherein the reminder is persistently displayed throughout the duration of the current commercial break.

17. The method of claim 13, wherein:
a received user-initiated command is associated with user activation of a designated user interface element of a remote control device that controls operation of the video receiving device.

* * * * *